UNITED STATES PATENT OFFICE.

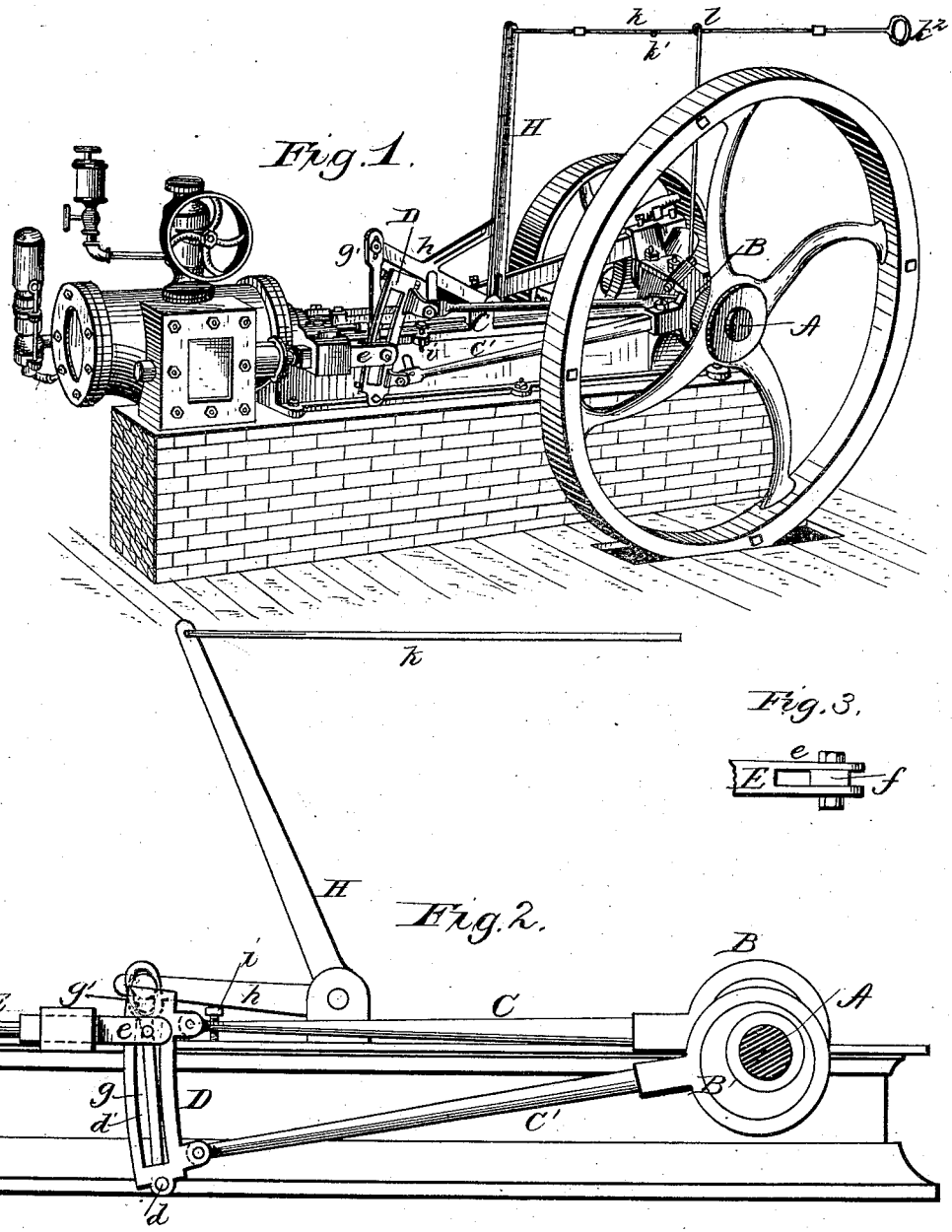

FRANK L. BLISS, OF CORRY, PENNSYLVANIA.

REVERSING-GEAR FOR STEAM-ENGINES.

SPECIFICATION forming part of Letters Patent No. 248,277, dated October 18, 1881.

Application filed March 8, 1881. (No model.)

*To all whom it may concern:*

Be it known that I, FRANK L. BLISS, of Corry, county of Erie, State of Pennsylvania, have invented certain new and useful Improvements in Reversing-Gear for Steam-Engines, of which the following is a full, clear, and exact description, reference being had to the accompanying drawings, making part of this specification, in which—

Figure 1 is a perspective view of an engine with my improvements applied. Fig. 2 is a side elevation, showing my improvement in reversing-gear; and Fig. 3 is a detail plan view, showing the end of the valve-rod with its swivel-block.

My invention relates to a novel arrangement of means for actuating the reversing-gear of the engine; and it consists in the combination, with the slotted reversing-link, of a pivoted link or rod, an elbow-lever having a slotted connection therewith, and a rest or stop for said lever, whereby, through the slotted connection with the reversing-link, all jar or vibration is removed from the actuating-lever, such as would endanger its accidental displacement, as hereinafter explained.

In the accompanying drawings, A represents the main engine or crank shaft, to which the eccentrics B B', actuating the valve, are secured. These eccentrics are arranged side by side, and may be made in one piece in the form of a double eccentric, if preferred, and the straps surrounding them are connected by rods C C', one with the upper and the other with the lower end of a slotted link, D, which slides up and down within the forked end $e$ of the valve-rod E upon a block, $f$, (see Fig. 3,) pivoted in the forked end $e$, said block fitting snugly between the inner adjacent walls of the slot $d$, in link D, and serving to guide and steady the movements of said link. The operation of this slotted sliding link in reversing the engine is well understood and need not be described. This link D has the lower end of a link, $g$, pivoted to it, the upper end of said link being connected, through a slot and pin, with the horizontal arm $h$ of an elbow or bell-crank lever, H. The slot is shown at $g'$ in the upper end of link $g$; but it may be made in the arm $h$ of the lever, or at the lower end of the link $g$, at the joint $d$, between the links D and $g$.

The frame or bed of the engine is provided with a stop or adjustable set-screw at $i$, and the slot at $g'$ permits the arm $h$ of the lever H, when down, to rest on said stop, thus relieving the lever from the vibration due to the movement of the link D, thereby preventing displacement of the lever, which is important.

The upright arm of the lever H has a rod, $k$, connected with it, which is supported in suitable guides, $l$, and extends to any desired point, for enabling the operator to control the reversing-gear at any required distance from the engine. This rod may be tubular, in the form of sections or lengths of small gas-pipe, coupled together in the usual manner, and is provided with a joint at $k'$, between the lever H and the guide $l$ nearest thereto, to accommodate the vibration in the arc of a circle of the arm of the lever with which the rod $k$ is connected.

The outer end of the rod $k$ has an eye or hook, $k^2$, formed upon it, serving to connect it to pins adjusted in their arrangement to the different positions to which it is required to adjust the link D. Under this arrangement it will be seen that the link D can be given a positive movement in either direction, whether for reversing the engine or for throwing it out of action, by bringing the link midway of its throw upon the swiveling block, and thus stopping the movement of the valve.

The arrangement described has been found especially applicable to oil-engines, where the engine is frequently necessarily located at considerable distance from the well or derrick where the operator is required to be; but it will be apparent that its use is not necessarily limited to such engines, but it may be applied to other engines with equal advantage, and especially to such as require to be operated from a distance.

I would state that I am aware that engines have been reversed or controlled by attendants at a distance from the engine by means of a cord running over suitable guide-pulleys; but in this case the movement for reversing was positive only in one direction, dependence being had for movement in the opposite direction upon the gravity of the parts or upon added weights or springs. This I do not claim; but What I do claim is—

5. The elbow-lever and link having a slotted connection, as described, for adjusting the link D, in combination with the stop or set-screw for relieving the lever from the vibration due to the movement of said link D, substantially as described.

F. L. BLISS.

Witnesses:
ALBERT TRUESDELL,
C. H. BAGLEY.